United States Patent [19]

Wristers

[11] 4,207,205

[45] Jun. 10, 1980

[54] REDUCTION OF TICL₄ WITH REDUCING AGENTS MODIFIED WITH LEWIS BASES

[75] Inventor: Harry J. Wristers, Baytown, Tex.

[73] Assignee: Exxon Research & Engineering Co., Florham Park, N.J.

[21] Appl. No.: 878,854

[22] Filed: Feb. 17, 1978

Related U.S. Application Data

[63] Continuation-in-part of Ser. No. 622,956, Oct. 16, 1975, abandoned.

[51] Int. Cl.² .............................................. C08F 4/64
[52] U.S. Cl. .............................. 252/429 B; 526/142; 526/144; 252/441
[58] Field of Search .................................... 252/429 B

[56] References Cited

U.S. PATENT DOCUMENTS

| | | | |
|---|---|---|---|
| 3,116,274 | 12/1963 | Boehm et al. | 252/429 B X |
| 3,196,143 | 7/1965 | Stewart et al. | 252/429 B X |
| 3,769,233 | 10/1973 | Hermans et al. | 252/429 B X |
| 3,801,558 | 4/1974 | Fletcher et al. | 252/429 B X |
| 3,813,374 | 5/1974 | Perry | 252/429 B X |
| 3,864,278 | 2/1975 | LaHeij et al. | 252/429 B |

FOREIGN PATENT DOCUMENTS 1391067 4/1975 United Kingdom .
1391068 4/1975 United Kingdom .

OTHER PUBLICATIONS

Yamaguchi, Jap. Pub. Appln. No. Shd. 50-112,289/1975, Published 9/3/75.
Boor, "Macromolecular Reviews," vol. 2, p. 115.
Jordan, *The Stereochemistry of Macromolecules*, vol. 1, (1967), Edited by A. D. Ketley, Pub. by Marcel Decker, Inc., pp. 1–45.

*Primary Examiner*—Patrick Garvin
*Attorney, Agent, or Firm*—D. A. Roth; M. B. Kurtzman

[57] ABSTRACT

Novel TiCl₃ catalytic complexes for the stereospecific polymerization of alpha-olefins and to a process for preparation of these catalytic complexes which are obtained by reduction of TiCl₄ in the presence of a Lewis base which has preferably been complexed with the reducing agent. Furthermore, the present invention relates to a process for improved polymerization of alpha-olefins to crystalline polyolefins in high yields and high stereospecificity using these catalytic complexes.

13 Claims, No Drawings

REDUCTION OF TICL₄ WITH REDUCING AGENTS MODIFIED WITH LEWIS BASES

CROSS REFERENCE TO RELATED APPLICATIONS

This application is a continuation-in-part of copending application Ser. No. 622,956, filed Oct. 16, 1975, and now abandoned.

BACKGROUND OF THE INVENTION

It is known in the art that alpha-olefins can be polymerized in the presence of catalytic systems containing solid $TiCl_3$ or solid $TiCl_3$ mixed with or cocrystallized with solid metallic halides and activated by an organic compound of aluminum.

These solid compositions containing titanium trichloride can be prepared by a number of different processes. One of these processes is the reduction of $TiCl_4$ by hydrogen. Another process consists of reducing $TiCl_4$ with a metal such as aluminum obtaining titanium trichloride cocrystallized with aluminum chloride. Another process preferred for several reasons is reduction of $TiCl_4$ with alkyl aluminum (halides). The $TiCl_3$ product then obtained is normally in the brown beta form and contains either aluminum chloride or alkyl aluminum chloride by-products, or both, associated with the $TiCl_3$. For optimum catalytic effects, it is preferred that this brown material be converted to the purple form by either heating or using excess titanium tetrachloride.

When alpha-olefins, for example propylene, are polymerized with these catalysts, commercially undesirable amounts of amorphous polypropylene is formed along with the desirable isotactic crystalline polypropylene. It is well known in the art that third components can be added as complexing agents to titanium trichloride catalysts to improve isotacticity of the crystalline polyolefins, although usually at the cost of reduced efficiency of the polymerization reaction.

Thus, Boor & Jordan have described how titanium trichloride can be improved by the addition of Lewis bases (J. Boor, Jr., "Active Site in Ziegler Catalysts", page 115 in "Macromolecular Reviews, Vol. 2"; see also D. O. Jordan, "Ziegler Natta Polymerization" in "The Stereochemistry of Macromolecules, Vol. 1", edited by A. D. Ketley, 1967, Marcel Decker Inc.).

Grignard reagents comprising magnesium compounds complexed with ethers have been used to reduce $TiCl_4$ to $TiCl_3$ for ethylene polymerizations. See U.S. Pat. No. 3,801,558. But the ethers are only used to solubilize the Grignard reagent which is otherwise hydrocarbon-insoluble.

That $TiCl_3$ catalysts can be improved by the addition of Lewis bases, for example ethers, and/or $TiCl_4$ treatments have been disclosed by Solvay et Cie, in German patent DT-2213086 (10-5-72). Solvay et Cie demonstrated in that patent how $TiCl_4$ can be reduced with diethyl aluminum chloride to yield a brown reduction product containing titanium trichloride. This brown reduction product separated from the reaction medium was subsequently treated with a special ether, and subsequent to the ether treatment the reaction product was separated and then treated with excess titanium tetrachloride to form a purple catalyst, which when separated from the reaction medium could be activated with diethyl aluminum chloride to yield a catalyst active for the stereospecific polymerization of propylene.

Thus it is well known that Lewis bases, and specifically ethers, can be used to treat preformed catalysts to improve the stereospecificity and the activity of said catalysts. Nevertheless, carrying out the reduction step for reducing $TiCl_4$ to $TiCl_3$ in the presence of an aluminum alkyl Lewis base complex has not been reported nor is it obvious.

SUMMARY OF THE INVENTION

Highly efficient process to make outstanding quality catalyst results from reduction of $TiCl_4$ to $TiCl_3$ in the presence of Lewis bases which complex with the reducing agents.

DESCRIPTION OF THE PREFERRED EMBODIMENTS

It has been found, and forms the substance of this invention, that titanium tetrachloride can be reduced with alkyl aluminum (halides) in the presence of Lewis bases to result in highly stereospecific active catalysts.

The advantages of such a process are: (1) the activity of the reducing agent is tempered thereby allowing greater control of the reduction step; (2) the entire process sequence is simplified since the entire reduction and catalyst preparation is performed in only one reactor by simple sequential addition of reagents and the crystal conversion of beta $TiCl_3$ to violet $TiCl_3$ is greatly simplified; and (3) by this process highly stereospecific highly active catalysts having properties far superior than those commercially available are formed.

The catalysts are preferably formed in a novel two-step process, whereby the first step $TiCl_4$ is added to an ether/aluminum alkyl (halide) complex or vice versa at a temperature low enough to control the reduction step, and after the reagents have been mixed the temperature is increased to effect complete reduction while maintaining a specified stirring speed so as to obtain the catalyst particles in a controlled form. Subsequent to the completed reduction the second phase of the catalyst preparation is enacted by converting the brown reduced titanium halide to the purple form. Crystal conversion can be obtained by adding $TiCl_4$ to the reaction mixture and heating the catalyst and $TiCl_4$ at a specified temperature for a time long enough to convert the catalyst to the purple form. Another desirable manner of obtaining crystal conversion of the brown titanium halide to the purple form is to contact the reduced titanium halide with a chlorinated hydrocarbon and aging.

Although it is usually preferred to have the catalyst in the purple $\alpha$, $\gamma$ or $\delta$ form, it is recognized that active catalysts in the brown beta form can also be prepared by this treatment. These brown catalysts are the subject of a copending commonly assigned patent application by the instant inventor, i.e. Ser. No. 573,054.

Thus, catalysts are prepared by complexing aluminum alkyl halides with the general formula $AlR_nX_{3-n}$ where R is a hydrocarbon radical containing from 1 to 8 carbon atoms, preferably 1 to 4 carbon atoms (where the best results are obtained when R is selected from the group of alkyl, aryl radicals) and X is a halogen selected from chlorine, fluorine, bromine, and iodine where the best results are obtained when X is chlorine and n is any number between 1 and 3. Preferably, n is 1.5 to 2.5, with the best results obtained when n is equal to about 1.7. It is also understood that the reducing agent can be of the class of aluminum alkyl alkoxides, where in the above general formula X would be OR instead of halogen; or that the reducing agent is of the class of the organo aluminum polymer compounds whereby two or more of the above described aluminum alkyl reducing agents are joined by oxygen, nitrogen, sulfur, or methylene bridges.

The Lewis base complexing agent that is complexed to the aluminum alkyl reducing agent can be any compound known in the art which complexes with Lewis acids. Thus those compounds containing one or more atoms or groups having one or more pairs of free electrons capable of effecting coordination with titanium and aluminum alkyl (halides) are generally usable. Specifically among the atoms capable of donating one or more pairs of electrons are those atoms of groups V and VI of the periodic table for example, oxygen, sulfur, nitrogen, phosphorous. As representative examples of compounds containing groups capable of furnishing one or more pairs of electrons, mention may be made of ethers, thioethers, phosphines and amines.

It is preferred to use as complexing agents those compounds having the general formula ROR', RSR', R(R')NR" where R, R' and R" are hydrocarbon radicals containing from 1 to 15 carbon atoms. The best results are obtained where R, R' and R" are branched hydrocarbon radicals containing from 2 to 8, preferably from 4 to 6, carbon atoms.

The complexing agent is mixed with the reducing agent in the ratio of from 1.01 to 5 or preferably in the ratio from 1.01-2 to 1. It can be premixed or can be mixed in the reactor and generated in situ. To the complex of aluminum alkyl and Lewis base is added the $TiCl_4$ or vice versa the $TiCl_4$ can be added to the complexed aluminum alkyl reducing agent in the following ratios expressed by the general formula:

compleximg agent$_{(x)}$:aluminum alkyl reducing agent$_{(y)}$: $TiCl_{4(z)}$ where x, y and z can have values from 1.01 to 10, 1-5, 1-20, respectively, or preferably 1.01-2, 1, 1-2, or most preferably 1.5, 1, 1, respectively.

While reduction can be effected from temperatures from $-80°$ to $+50°$ C., it is preferred to reduce $TiCl_4$ from $-30°$ to $+15°$ C., or most preferably from $-10°$ to $+5°$ C.

While many solvents can be used for the reduction, it is most preferred that the solvent is nonreactive solvent such as the parffinic or alkyl aromatic solvents. Thus, the type of inert solvents that are preferred are those selected from the paraffinic hydrocarbons containing from 5 to 12 carbon atoms. Most preferred solvents are taken from the group of pentane, hexane, heptane or iso-octane.

The concentration of reagents and the inert diluent can vary from 0.5 to 4 molar but best results are obtained when the concentration is between 2 and 3 molar.

A wide variety of stirring techniques can be effected during reduction leading in all cases to good catalysts. For better control of the final catalyst product, it is preferred to stir the reaction mixture in a smooth manner during the reduction and warm-up at a rate sufficient to yield catalyst particles having all approximately the same size. Preferred stirring rates are from 50 to 600 rpm; best results are obtained when the stirring rates are between 150 and 400 rpm.

The final reaction mixture is warmed up from the reducing temperature to an aging temperature which can be varied from 25° to 90° C., with best results obtained when the aging temperature is from 50° to 65° C. The rate of warm-up can vary from 0.1° to 3° C. per minute where the preferred results are obtained when the warm-up rate is from 0.5° to 1° C. per minute.

The catalyst is held at the aging temperature from ½ to 6 hours preferably from 1.5 to 2.5 hours.

Subsequent to the aging and in accordance with the first method for crystal conversion mentioned above, $TiCl_4$ is added to the reaction mixture in an amount where the $TiCl_4$ to $TiCl_3$ mole ratio can vary from 0.5 to 20 or preferably from 1 to 10 or most preferably from 1 to 3-5. The $TiCl_4$ can be added in an undiluted form which simplifies the process and the concentrations of reactants and presence of diluent can be varied so as to vary the concentration of the $TiCl_4$ in the reaction mixture from 5 to 75 vol. %, preferably from 25 to 50 vol. %.

The catalyst after such treatment with $TiCl_4$ is heat soak treated from ½ to 10 hours, preferably from 1 to 2 hours at temperatures which range from $+25°$ to $90°$ C., preferably from 50° to 65° C.

The thus prepared catalyst is separated from the reaction mixture and washed by decantation or filtration with the diluent used in the preparation or other unreactive hydrocarbons.

It is understood that for simplification also excess $TiCl_4$ can be treated with the aluminum alkyl ether complex so that the subsequent $TiCl_4$ treatment described above does not need to be effected.

In accordance with the second method of crystal conversion of brown $TiCl_3$ to the purple form the brown reduced $TiCl_3$ is contacted with a chlorinated hydrocarbon. Contacting may be accomplished in a number of ways. In accordance with one method, the reduction of the $TiCl_4$ takes place in the presence of the chlorinated hydrocarbon, i.e., $TiCl_4$ is added dropwise at the reducing temperatures to a mixture of the Lewis base/aluminum alkyl complex and chlorinated hydrocarbon. Upon reduction the temperature is raised as described above to accomplish aging and crystal conversion. In another manner, the chlorinated hydrocarbon is added upon completion of the reduction and aging step.

The chlorinated hydrocarbons that can be used in accordance with this invention can have from 1 to about 10 carbon atoms and can be either straight chained or branched. Preferably the chlorinated hydrocarbons can have from 1 to 5 carbon atoms with a chlorine to hydrogen ratio greater than 1 such as, for example, carbon tetrachloride, hexachloroethane, tetrachloroethylene, pentachloropropane, hexachloropropane, heptachloropropane, octachloropropane, hexachlorobutane, through perchlorobutane, and heptachloropentane through perchloropentane. In the most preferred aspects a $C_2$ or $C_3$ chlorinated hydrocarbon wherein the chlorine to hydrogen ratio is greater than 1 will be employed. Most desirably the $C_2-C_3$ hydrocarbon will be a perchlorohydrocarbon such as perchloroethane and perchloropropane.

The chlorinated hydrocarbon is desirably present in an amount of from about 0.5 to about 4 mols per gram atom of Ti and preferably from about 0.8 to about 2.5 mols per gram atom of Ti.

It is understood that the titanium tetrachloride can be premixed with other transition metal halides of groups IIIB, IVB, VB before reduction and separation and thereby generate a solid reduction product containing mixtures of transition metal halides, where these mixtures will generate polyolefins having different properties. Finally, it is also understood that the $TiCl_4$ reduced as described above can be reduced with and by metal alkyl (halides) of groups other than aluminum alkyl halides. Thus metal alkyl halides of groups IA, IIA, IIB, IIIA and IVA can be used.

Enough ether must be present to complex at least all of the aluminum compound in the catalyst, and it is preferable to have a slight excess of ether in the reduction mixture; however, the ether should not exceed the molar quantities of $AlEt_2Cl$ and $TiCl_4$, for then significant reduction would not be expected. Accordingly, within critical narrow ranges of ether:$AlEt_2Cl$:$TiCl_4$ mole ratios, highly active, stereospecific catalysts were obtained.

If in the reduction step, using $Et_2AlCl$, the ratio of ether:$AlEt_2Cl$ does not exceed 1 or if the ether:[$TiCl_4$+$AlEt_2Cl$] greater than or equals 1, conversion of the brown $TiCl_3$ to the purple form by excess $TiCl_4$ was not possible. See the table following for a summary of the results of using different ether ratios during reduction.

| Reducing Agent | $TiCl_4$:$AlEt_2Cl$:DIPE | Catalyst Color After $TiCl_4$ Treatment |
|---|---|---|
| $AlEt_2Cl$ . 2.0 DIPE | 1:0.5:1 | Purple |
| $AlEt_2Cl$ . 1.3 DIPE | 1:0.75:1 | Purple |
| $AlEt_2Cl$ . 2.0 DIPE | 1:1:2 | Brown |
| $AlEt_2Cl$ . 1.0 DIPE | 1:0.5:0.5 | Brown |
| $AlEt_2Cl$ . 1.0 DIPE | 1:1:1 | Brown |

Since the first step in the reduction yields $AlEtCl_2$, and since an $AlEtCl_2$:Base complex might be considered too weak to reduce $TiCl_4$, one might expect the yield of $TiCl_3$ to be limited to 50% of theoretical. See the following equations:

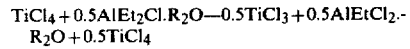

$$TiCl_4 + 0.5AlEt_2Cl.R_2O \rightarrow 0.5TiCl_3 + 0.5AlEtCl_2.R_2O + 0.5TiCl_4$$

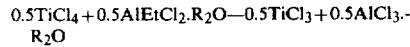

$$0.5TiCl_4 + 0.5AlEtCl_2.R_2O \rightarrow 0.5TiCl_3 + 0.5AlCl_3.R_2O$$

This concern is reasonable, for while $AlEtCl_2$ reduces $TiCl_4$, the $AlEtCl_2.R_2O$ complex with $TiCl_4$ yields only a clear green solution. However, the yield of solid catalyst actually obtained indicates that both ethyl groups in $AlEt_2Cl.R_2O$ function to reduce $TiCl_3$. Possibly $TiCl_3$ catalyzes the reduction of the $AlEtCl_2.R_2O.TiCl_4$ complex in the same way that $TiCl_3$ catalyzes the reduction of $TiCl_3R$. Another possibility is that $TiCl_4.R_2O$ complex reduces faster than $TiCl_4$, and that therefore in cases where the former can be formed, reduction proceeds.

It has been observed that the ether:$AlEt_2Cl$ ratio must exceed 1 for beta to delta $TiCl_3$ conversion to occur, but the reason for this critical ratio is not understood. At ratios below 1, free aluminum alkyl would be present, but why that should deposit $TiCl_3$ in a form less susceptible to rearrangement is difficult to explain, especially since $TiCl_3$ catalysts prepared without ether can be converted to the purple delta form by excess $TiCl_4$. See the following equations:

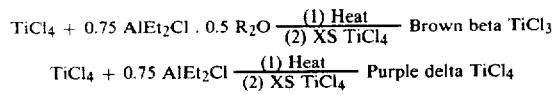

$$TiCl_4 + 0.75\,AlEt_2Cl \cdot 0.5\,R_2O \xrightarrow[\text{(2) XS } TiCl_4]{\text{(1) Heat}} \text{Brown beta } TiCl_3$$

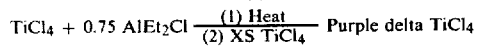

$$TiCl_4 + 0.75\,AlEt_2Cl \xrightarrow[\text{(2) XS } TiCl_4]{\text{(1) Heat}} \text{Purple delta } TiCl_4$$

One reaction that occurs at low $R_2O$:$AlEt_2Cl$ ratios is the disassociation of the $AlEtCl_2$ by-product, yielding the $AlCl_3.R_2O$ complex.

Triethyl aluminum can also in a similar manner be complexed with a Lewis base thereby decreasing the reducing power of the more active reducing agent. This lower activity is only observed when excess ether is present complexing all the triethyl aluminum.

The lower reduction rate observed with complexed $Et_2AlCl$ as compared with uncomplexed $AlEt_2Cl$ facilitates large scale catalyst preparation wherein temperature control becomes difficult.

Dimethyl aluminum chloride and trimethyl aluminum reduce $TiCl_4$ at a lower rate than the ethyl analogs; however, complexed with ether, days are required for reduction to be effected.

Lewis bases have been described in many patents and publications, such as U.S. Pat. Nos. 3,116,274, 3,825,524 and on page 31 of a book entitled SEMIMICRO QUALITITIVE ANALYSIS, by William C. Oelke, published in 1950 by D. C. Heath & Co. which are hereby incorporated by reference in their entirety.

In addition to the reduction step, the complexes of the invention can also be used as a cocatalyst for either the $TiCl_3$ catalysts made by the process of the invention or for $TiCl_3$ and other Ziegler transition metal catalysts.

The invention is further illustrated by the following examples:

EXAMPLE 1

To a 250 ml flask is added 24.5 cc (54.6 mm) of a 2.23 molar diethyl aluminum chloride solution in iso-octane. Then, 17.8 cc (27.3 mm) of a 1.53 molar solution of ethyl aluminum dichloride in hexane is added. The reducing agent mixture is cooled to 0° and 22.4 cc (109.2 mm) of diisopentyl ether is added dropwise. 6 cc (54.6 mm) of 100% $TiCl_4$ is added at a rate of 0.15 cc per minute. At the end of the titanium tetrachloride addition, the reaction mixture is held for 60 minutes and then warmed to 60° C. at a rate of 1° per minute.

The reaction mixture is held for 1 hour at 65° C., cooled to 35° C., and 60 cc (546 mm) of 100% $TiCl_4$ is added at a rate of 2 cc per minute. The stirring rate is cut back from the 300 rpm used during the reduction to 100 rpm and the solution is warmed to 60° C., held there for 2 hours. The catalyst examined on the microscope has turned purple and has a narrow particle size distribution where the average particle diameter is 12 microns. The catalyst is separated from the reaction medium by filtration and washed three times with 100% heptane.

To a 1,000 cc flask containing 500 cc of normal heptane at 65° C. is added 4.37 cc of a 1.6 molar solution of diethyl aluminum chloride in normal heptane. Then 0.70 grams of the catalyst as prepared above is added to the reaction mixture which has been saturated with propylene.

For 2 hours propylene is passed through the stirred solution and polypropylene is generated by the catalyst. At the end of 2 hours propylene is substituted by nitrogen and the polymer slurry is stirred for 12 hours with 1000 cc of isopropyl alcohol and then filtered. The polymer cake is washed with 100 cc of alcohol and the washings added to the filtrate. The filtrate is evaporated to yield 5.94 grams of waxy polymer and catalyst residue.

The polymer is dried at 60° C. and weighed to yield 87.36 grams of polymer of which 98.99% is insoluble in boiling heptane. After correction for the catalyst residue in the filtrate, the catalyst efficiency is calculated to be 125.4 grams of polymer per gram of catalyst for a 2 hour polymerization, 0.49% of the polymer is called waxy polymer, that is, polymer soluble in the heptane-isopropyl alcohol slurry and 98.5% of the polymer is insoluble in boiling heptane.

The polymer particles have a narrow particle size distribution, flow well and have an average diameter of 75 microns.

By comparison, commercial TiCl₃AA obtained from Stauffer Chemical would have a catalyst efficiency of 42 of which 92.5% of the polymer would be insoluble in boiling heptane. Furthermore, the polymer would have a wide particle size distribution.

By further comparison, a catalyst prepared by reduction of $TiCl_4$ with diethyl aluminum chloride, and heated to convert the catalyst from the brown to the purple form would have a polymerization catalyst efficiency of 38 and of which 91.5% of the polymer would be insoluble in boiling heptane.

EXAMPLES 2-4

Other catalysts were prepared according to the date illustrated in Table 1 below for examples 2-4 where the concentration of $TiCl_4$ and the ether:aluminum alkyl ratio was varied.

EXAMPLES 5-11

Catalysts were prepared by the reduction of $TiCl_4$ with diethyl aluminum chloride complexed with diisopentyl ether or ethyl ether and as shown in Table 2 below, improved catalyst having high efficiencies and high percent heptane insolubles were obtained.

EXAMPLES 12-14

$TiCl_4$ was reduced with triethyl aluminum complexed with diisopentyl ether and as illustrated in Table 3 below yielded catalyst that had high catalyst efficiency and high percent heptane insolubles.

EXAMPLE 15

To a 250 ml flask is added 24.5 cc (54.6 mm) of a 2.23 molar diethyl aluminum chloride solution in isooctane. Then 17.8 cc (27.3 mm) of a 1.53 molar solution of ethyl aluminum dichloride in hexane is added. The reducing agent mixture is cooled to 0° C. and 22.4 cc (109.2 mm) of diisopentyl ether is added dropwise. To the mixture is added 9.05 gm (38.22 mm) hexachloroethane. 6 cc (54.6 mm) of 100% $TiCl_4$ is added at a rate of 0.15 cc per minute. At the end of the $TiCl_4$ addition, the reaction mixture is held for 60 minutes and then warmed to 60° C. at a rate of 1° per minute.

The reaction mixture is held for 1 hour at 60° C., then heated to 80° C. and held for five hours. The catalyst is then separated by filtration and washed. The catalyst is purple in color, highly efficient and obtains polypropylene having high percent heptane insolubles.

TABLE 1

REDUCTION OF TiCl₄ WITH COMPLEXED ALUMINUM ALKYL HALIDES AT 0° C.

| Exp. No. | Comments | Reducing Agent $AlR_nCl_{3-n}$ | $TiCl_4$: $AlR_nCl_{3-n}$:$R_2O$ | $TiCl_4$:$TiCl_3$ After Treatment, Mole Ratio | Color Step 1 | Color Step 2 | Cat. Eff. W/W.2 hrs | Waxy Polymer, % | $C_7$-Insol., % |
|---|---|---|---|---|---|---|---|---|---|
| 1 | No separation between reduction and TiCl₄ treatment; 100% TiCl₄ used. | AlEt₂Cl . 0.5 AlEtCl₂ . 2.0 DIPE | 1:1.5:2 | 10 | Black | Purple[1] | 125.4 | 0.5 | 98.5 |
| 2 | No separation between reduction and TiCl₄ treatment | AlEt₂Cl . 0.5 AlEtCl₂ . 2.0 DIPE | 1:1.5:2 | 5 | Brown | Purple[2] | 174.4 | 1.6 | |
| 3 | No separation between reduction and TiCl₄ treatment. | AlEt₂Cl . 0.5 AlEtCl₂ . 1.5 DIPE | 1:1.5:1.5 | 5 | Brown | Brown[3] | | | |
| 4 | No separation between reduction and TiCl₄ treatment | AlEtCl₂ . 2 DIPE | 1:1:2 | — | Clear Green Solution | | | | |

[1] Narrow P.S.D.
[2] Medium P.S.D.
[3] Narrow P.S.D.

TABLE 2

REDUCTION OF TiCl₄ WITH COMPLEXED ALUMINUM ALKYL HALIDES AT 0° C.

| Exp. No. | Comments | Reducing Agent $AlR_nCl_{3-n}$ | $TiCl_4$: $AlR_nCl_{3-n}$:$R_2O$ | $TiCl_4$:$TiCl_3$ After Treatment; Mole Ratio | Color Step 1 | Color Step 2 | Cat. Eff. W/W.2 hrs | Waxy Polymer, % | $C_7$-Insol., % |
|---|---|---|---|---|---|---|---|---|---|
| 5 | No separation between reduction and TiCl₄ treatment | AlEt₂Cl . 2 DIPE | 1:0.5:1 | 10 | Brown | Purple[1] | 133.8 | 0.6 | 98.2 |
| 6 | No separation between reduction and TiCl₄ treatment | AlEt₂Cl . 1.33 DIPE | 1:0.75:1 | 10 | Brown | Purple[2] | 126.0 | 1.8 | 96.3 |
| 7 | No separation between reduction and TiCl₄ treatment; 100% TiCl₄ used | AlEt₂Cl . 1.33 DIPE | 1:0.75:1 | 10 | Brown-Purple | Purple[3] | 127.1 | 0.9 | 97.6 |
| 8 | No separation between | AlEt₂Cl . 1.33 | 1:0.75:1 | 5 | Brown- | Purple[4] | 96.4 | 2.0 | 95.4 |

TABLE 2-continued
REDUCTION OF TiCl₄ WITH COMPLEXED ALUMINUM ALKYL HALIDES AT 0° C.

| Exp. No. | Comments | Reducing Agent $AlR_nCl_{3-n}$ | $TiCl_4$: $AlR_nCl_{3-n}$:$R_2O$ | $TiCl_4$:$TiCl_3$ After Treatment; Mole Ratio | Color Step 1 | Color Step 2 | Cat. Eff. W/W.2 hrs | Waxy Poly- mer, % | $C_7$- Insol., % |
|---|---|---|---|---|---|---|---|---|---|
|  | reduction and TiCl₄ treatment; 100% TiCl₄ used | DIPE |  |  | Purple |  |  |  |  |
| 9 | No separation between reduction and TiCl₄ treatment; 100% TiCl₄ used | AlEt₂Cl . 1.33 DIPE | 1:0.75:1 | 3 | Brown-Purple | Burgundy[5] | 92.5 | 1.7 | 95.9 |
| 10 | No separation between reduction and TiCl₄ treatment; 100% TiCl₄ used | AlEt₂Cl . 1.33 DIPE | 1:0.75:1 | 1 | Brown-Purple | Purple[6] | 93.7 | 1.6 | 95.6 |
| 11 | No separation between reduction and TiCl₄ treatment | AlEt₂Cl . 2 Et₂O | 1:0.5.1 | 10 | Brown | Purple[7] | 46.5 | 2.6 | 92.9 |

[1] P.S.D.
[2] P.S.D.
[3] Wide P.S.D.
[4] Narrow P.S.D.
[5] Medium P.S.D.
[6] Medium P.S.D.
[7] P.S.D.

TABLE 3
REDUCTION OF TiCl₄ WITH COMPLEXED ALUMINUM ALKYL HALIDES AT 0° C.

| Exp. No. | Comments | Reducing Agent $AlR_nCl_{3-n}$ | $TiCl_4$: $AlR_nCl_{3-n}$:$R_2O$ | $TiCl_4$:$TiCl_3$ After Treatment, Mole Ratio | Color Step 1 | Color Step 2 | Cat. Eff. W/W.2 hrs | Waxy Polymer, % | $C_7$-Insol., % |
|---|---|---|---|---|---|---|---|---|---|
| 12 | No separation between reduction and TiCl₄ treatment; 100% TiCl₄ used; low catalyst yield | AlEt₃ . 2 DIPE | 1:0.5:1.0 | 10 | Green | Purple[1] | 56.6 | 0.7 | 98.1 |
| 13 | No separation between reduction and TiCl₄ treatment | AlEt₃ . 1.67 DIPE | 1:0.6:1.0 | 10 | Black | Brown |  |  |  |
| 14 | No separation between reduction and TiCl₄ treatment; AlEt₃ added to TiCl₄ . R₂O complex. | AlEt₃ . 1.67 DIPE | 1:0.6:1.0 | 10 | Brown | Purple | 105.4 | 1.0 |  |

Although diisopentyl ether is an excellent performer and had been used in many experiments of the invention, it is hereby disclosed that another excellent performing ether is butyl ether.

It is to be emphasized that the ether ethyl aluminum chloride ratio must exceed 1 in order for the TiCl₄ to be converted to the purple TiCl₃ after the final TiCl₄ after-treatment.

It is also apparent that the ether aluminum ethyl chloride complex actually changes the mechanism of reduction and the properties of the final catalyst product.

Another important observation regarding the complex of the invention is that the various aluminum alkyl or aluminum alkyl chloride complexes are quite different depending on the Lewis acid strength of the aluminum alkyl. Thus, the strongest reducing agents go in the order of aluminum triethyl, followed by aluminum diethyl chloride, followed by ethyl aluminum dichloride. But the Lewis acidity strength of these reducing agents proceeds from strong to weak, e.g., from ethyl aluminum dichloride, which is stronger than diethyl aluminum chloride, which is stronger than triethyl aluminum.

The ethyl aluminum dichloride complex with diisopentyl ether is the least effective reducing agent.

The best catalyst results are obtained when using a mixture of ethyl aluminum dichloride and diethyl aluminum dichloride with diisopentyl ether.

When diethyl aluminum chloride is used by itself, as pointed out above, the ether diethyl aluminum chloride ratio must exceed 1 in order to obtain the desired purple delta TiCl₃.

Triethyl aluminum complexed with diisopentyl ether was observed to be the most active reducing agent yielding very high percentage yields at temperatures around 0° C., but suffering from a very broad particle size distribution.

What is claimed is:

1. In a process for preparing a TiCl₃ catalyst complex for stereoregular polymerization of alpha-olefins, wherein said catalyst complex is prepared by reducing TiCl₄ in a non-reactive solvent with an aluminum alkyl to obtain a brown reduced TiCl₃ solid compound and activating the brown reduced TiCl₃ solid compound by conversion to the purple form, the improvements comprising:

(1) in said reduction step
     (a) contacting TiCl₄ with a dihydrocarbon ether-/aluminum alkyl complex at a temperature within the range of about −80° to about +50° C., wherein said aluminum alkyl compound is selected from aluminum triethyl, diethyl aluminum chloride and mixtures of diethyl aluminum chloride and ethyl aluminum dichloride, and said complex being obtained by complexing said aluminum alkyl with an excess of said ether, wherein the mole ratio of ether:aluminum alkyl:-TiCl$_4$ is in the range of about 1.01–10:1–5:1–20 and the ratio of dihydrocarbon ether to aluminum alkyl is in the range of about 1.01 to 5:1;

(b) warming the resulting reaction mixture of (a) to about 25°–90° C. and maintaining said temperature for about ½ to about 6 hours; and (a) in said activating step, contacting said brown reduced solid TiCl$_3$ complex with one of TiCl$_4$ or a chlorinated hydrocarbon for a time and temperature sufficient to convert the brown TiCl$_3$, to the purple form.

2. The process of claim 1, wherein the reagents in said reducing step are employed at a mole ratio of dihydrocarbon ether:aluminum alkyl compound:TiCl$_4$ within the range of about 1.01–2:1:1–2.

3. The process of claim 1, wherein said dihydrocarbon ether has the formula ROR', where R and R' are hydrocarbon radicals containing from 2 to 8 carbon atoms.

4. The process of claim 1, wherein the aluminum alkyl compound is aluminum diethyl chloride wherein the mole ratio of dihydrocarbon ether to aluminum diethyl chloride exceeds 1 and the mole quantity of dihydrocarbon ether as compared to the totality of TiCl$_4$ and aluminum diethyl chloride is less than 1.

5. The process of claim 1, wherein the dihydrocarbon ether/aluminum alkyl complex consists essentially of a mixture of diethyl aluminum chloride and ethyl aluminum dichloride complexed with diisopentyl ether.

6. The process of claim 1, wherein, in said activating step, the TiCl$_4$ is added directly to the reaction mixture of the reducing step (1).

7. The process of claim 6, wherein TiCl$_4$ is added to undiluted in an amount sufficient to provide a concentration of about 5–75 volume percent TiCl$_4$.

8. The process of claim 1 wherein the chlorinated hydrocarbon has from 1 to 10 carbon atoms.

9. The process of claim 8 wherein the chlorinated hydrocarbon has from 1 to 5 carbon atoms with a chlorine to hydrogen ratio greater than 1.

10. The process of claim 9 wherein the chlorinated hydrocarbon has 2 or 3 carbon atoms.

11. The process of claim 10 wherein the chlorinated hydrocarbon is hexachloroethane.

12. The process of claim 1 wherein the chlorinated hydrocarbon is present during the reducing step.

13. The process of claim 1 wherein the chlorinated hydrocarbon is added after reduction is obtained.

* * * * *